United States Patent [19]

Cawley

[11] Patent Number: 5,103,217
[45] Date of Patent: Apr. 7, 1992

[54] ELECTRONIC IMAGE PROCESSING

[75] Inventor: Robin A. Cawley, Newbury, United Kingdom

[73] Assignee: Quantel Limited, Newbury, England

[21] Appl. No.: 277,235

[22] Filed: Nov. 29, 1988

[30] Foreign Application Priority Data

Dec. 10, 1987 [GB] United Kingdom ............... 8728836

[51] Int. Cl.$^5$ ............................................. G09G 1/06
[52] U.S. Cl. .................................... 395/129; 340/703; 340/747; 340/729; 395/119
[58] Field of Search ............... 340/729, 747, 709, 710, 340/703; 364/518, 519, 520, 521, 522

[56] References Cited

U.S. PATENT DOCUMENTS

| | | | |
|---|---|---|---|
| 4,318,096 | 3/1982 | Thornburg et al. ............... | 340/706 |
| 4,679,041 | 7/1987 | Fetter et al. ........................ | 340/729 |
| 4,692,880 | 9/1987 | Merz et al. ......................... | 340/729 |
| 4,754,269 | 6/1988 | Kishi et al. ......................... | 340/729 |
| 4,808,988 | 2/1989 | Burke et al. ........................ | 340/729 |
| 4,888,713 | 12/1989 | Falk ................................... | 340/729 |
| 4,899,295 | 2/1989 | Nonweiler ......................... | 340/729 |
| 4,901,064 | 2/1990 | Derring .............................. | 340/729 |

FOREIGN PATENT DOCUMENTS

| | | |
|---|---|---|
| 0211345 | 2/1987 | European Pat. Off. . |
| 0248626 | 12/1987 | European Pat. Off. . |
| 2495867 | 6/1982 | France . |
| 2158671 | 11/1985 | United Kingdom . |

OTHER PUBLICATIONS

Electronics, vol. 59, No. 28, 7th Aug. 1986, pp. 97–100, New York, U.S.; "Now 3-D CAD images can be moved in real time".

Primary Examiner—Ulysses Weldon
Assistant Examiner—M. Fatahiyar
Attorney, Agent, or Firm—Cooper & Dunham

[57] ABSTRACT

Electronic image processing for manipulating data representing a three dimensional object. The three dimensional object. The three dimensional position and color of surface elements of an object are stored wherein the data for each surface element represents characteristics of a finite elemental area of the surface or skin of an object. The data may be displayed in two dimensions to provide real time manipulation of the three dimensional data.

25 Claims, 4 Drawing Sheets

ELECTRONIC IMAGE PROCESSING

BACKGROUND OF THE INVENTION

The present invention relates to electronic image processing wherein data represents three dimensional objects.

Computer graphics systems are known in which the positions of points in three dimensional space may be stored, usually in the form of Cartesian coordinates. Such systems may be used, for example, in computer aided design, graphic art, computer animation or flight simulation. In all of these systems the information is presented to an observer as a two dimensional projection on a television - type monitor or similar device.

In known systems the three dimensional data is stored as points and the object may be displayed by connecting the points by lines producing a wire frame model. Systems capable of manipulating these wire frame models in real-time have been known for some time, the real-time manipulation of solid objects being much more difficult.

A system for simulating three dimensional deformations to a planar surface is disclosed in European patent application 211,345, having specific application to displaying faces and body shapes. The deformations are normal to the planar surface. The surfaces produced are defined with respect to the planar surface and are not true three dimensional surfaces.

A computer aided design system in which positional and colour information both form part of the three dimensional data is disclosed in an article "Now 3-D CAD images can be moved in real time" published in the US journal "Electronics" on 7 Aug. 1986. The article discloses an application of a Hewlett-Packard 320SRX chip which is particularly fast at rendering three dimensional point data to a two dimensional display image, a process it refers to a scan conversion. The three dimensional data comprises six fields representing x, y, z position and RGB colour. A Bresenham alogorithm is then used which takes stored point values and interpolates them to find every pixel of the two dimensional image that must be lit to draw the line.

In the known systems the emphasis is placed on minimising the three dimensional data so as to (a) reduce storage space and, (b) reduce processing required convert the data to a two dimensional image. However a problem with systems of this type is that they do not allow modification of fine detail of the three dimensional image thus restricting the efforts of artists to create realistic images which are not obviously computer generated.

In our United Kingdom Patent No. 2,119,594 (equivalent to U.S. Pat. No. 4,709,393) there is described a video processing system for picture shape manipulation which comprises frame storage means for receiving a sequence of picture point signals constituting an input picture, address means for identifying selected addresses in said storage means for the sequence of picture point signals and for storing the picture point signals at the repective identified addresses, and means for reading the picture point signals from the addresses in said storage means in a predetermined order to reproduce picture point signals representing the input picture after shape manipulation. The picture point signals constituting the input picture are received in raster order, and the selection of the addresses in the frame storage means at which the picture point signals are stored is such as to rearrange the picture point signals (relative to their raster position on input) to produce the change in shape of the picture. Upon reading the picture point signals from the store, the addresses in the store are accessed in sequence. The shape manipulation which is required may have the result that a selected address for a particular picture point signal at the input does not coincide with the address of any storage location in the frame storage means but falls between a number of adjacent storage location addresses. In that case the picture point signal is distributed proportionally to the adjacent addresses.

A selection of addresses for producing a change in the shape of a particular input picture defines the position of a matrix of points on a "skin" conforming to the desired shape, and when the addresses are used to rearrange the input picture point signals, the corresponding picture assumes the shape of the skin. Each selection of addresses defining a particular skin is called an address map, and a store is provided for storing a variety of address maps defining shape transformations. By using a series of related shapes, a corresponding series of input pictures (which may in fact be modified repetitions of a single input picture) appear to change continuously through the series of shapes giving the effect of animation.

In our United Kingdom Patent No. 2,158,671 (equivalent U.S. patent application No. 713,028) there is described a video processing system generally similar to that refered to in the proceeding paragraph but in which operator controlled means is provided for manipulating a selection of address signals constituting an address map, to represent movement of the skin defined by the address map. Such movement may be a translation or rotation, or both, of the skin. For example assuming a particular address map defines a sphere, the operator controlled manipulation may define the sphere in successive positions as it undergoes a combined rotation and translation. To define the sphere, the address map comprises three dimensional addresses, and the addresses are projected on a notional viewing surface, before being used to identify the two dimensional addresses in the frame storage means for the input picture point signals. The rotation of the skin caused by the operator controlled means produces the effect of viewing the sphere from a changing viewpoint. The effect is therefore called "floating viewpoint".

In our British Patent No. 2,089,625 (equivalent to U.S. Pat. No. 4,633,416) there is described a video image creation system including operator controlled drafting means for designating points on a desired image, means for producing first signals representing a characteristic to be imparted to the image at said points, a store having storage locations corresponding to points on the image, processing means for producing for each point designated by said drafting means a new image signal which is a function of said first signal and of a previous image signal for the same point derived from the location in said store corresponding to the respective point, means for storing the new image signal at the location in said store corresponding to the respective point, and means for reading image signals from the store to produce an image corresponding to the stored signal. The aforesaid characteristic to be imparted to the image is usually a colour selected by the operator and the effect of the processing means is to blend this colour with any previous colour stored in the store for the particular point designated by the operator to receive the "new" colour.

SUMMARY OF THE INVENTION

An object of the present invention is to provide an improved electronic image processing device which is capable of modelling or animating an object or skin defined by address signals. A further object of the present invention to be provide an improved electronic processing device in which modelling or animation can be accompanied by a change in surface characteristics of the object.

In accordance with the present invention there is provided an electronic image processing apparatus for manipulating data representing a three dimensional object, characterised by a memory device (skin store) arranged to store data representing the three dimensional position and colour of surface elements of an object wherein the data for each surface element represents characteristics of a finite elemental area of the surface or skin of an object, and processing means for selectively modifying data for one or more of said surface elements.

The advantage of the present invention is that the data is stored as surface elements, and not points from which a wire frame is constructed, thereby significantly improving accessibility to the data. The three dimensional data may be viewed by creating a two dimensional image in which data representing selected surface elements, wherein selection is dependent upon viewing position, contribute to one or more locations in the framestore and said framestore locations are arranged to accumulate contributions supplied thereto. Thus the process of converting three dimensional data to two dimensional data is significantly simplified compared to systems known in the prior art by providing significantly more three dimensional memory space.

Preferably, positional information and colour information may be selectively manipulated. In a preferred embodiment modifications are only made to locations in the frame store containing contributions from manipulated surface element data. Thus, although containing a vast number of stored elements, the apparatus may be provided with manually operable means to effect modifications to the displayed object, such as chiselling or painting, in real time. The object may therefore be created totally in response to the operations of an artist, who has access to the fall definition of the system, thus enabling objects to be created with a more realistic quality.

DESCRIPTION OF THE PREFERRED EMBODIMENT

Figure 2:
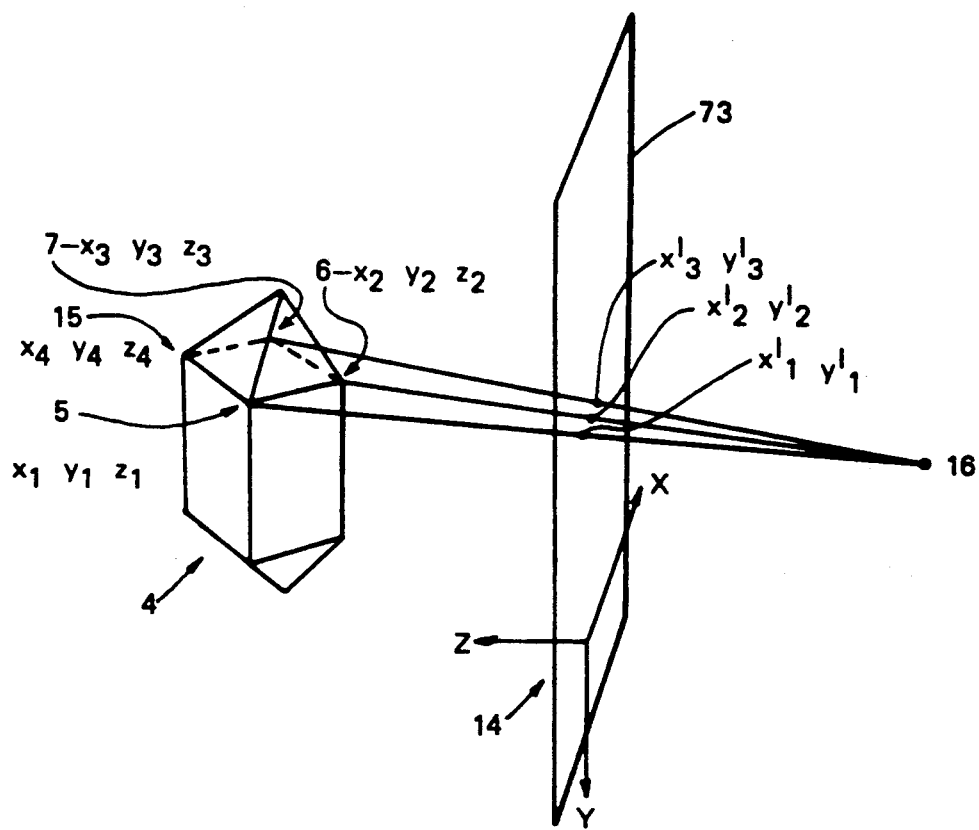
FIG. 2 is a diagram explanatory of FIG. 2

Referring to the drawing, reference 1 denotes a so-called "skin" store which comprises a large capacity semi-conductor store. It has the capacity to store digital signals sufficiently defining the surface or skin of a three dimensional object with a definition comparable with or better than that available in a television picture. It has storage locations or addresses for each of a multiplicity of elemental area distributed over the skin, the depth of each storage location being such that each address can store R G B component signals defining the colour of the skin at the respective elemental area, an S component defining a keying or stencil signal associated with the respective area, and X Y Z components defining its address in space, relative to a pre-determined system of coordinates. The signals may have eight bits for each colour component, 2 to 4 bits for the S component and say twenty-four bits for each of the X Y Z components. The locations in the store can be addressed sequentially or selectively by mans of an address generator 2 controlled by a computer 3, which exercises a variety of control functions. In general, when a store location is addressed to read from the store 1, reading is followed by a write cycle in which the same or modified signals are written in the store. In FIG. 2, reference 4 denotes a simple object the skin of which, it is assumed, is defined by signals in the store 1. References 5, 6, 7 denote representative points (X1 Y1 Z1), (X2 Y2 Z2), (X3 Y3 Z3), respectively. The coordinates are stored in respective storage locations in the store 1 as are the colour components R G B and the stencil signal S. Similar information is stored for every elemental area (element) on a closed network distributed over the surface of the object. For the simple object shown in FIG. 2 much of the information would be redundant, since the object is composed of a relatively small number of plane facets, but in general many elements are required to represent finely worked surfaces and they must be distributed evenly over the entire skin. The number of storage locations required in the store 1 to give adequate definition for the skin shapes likely to be encountered may be at least four times the number usual in a television frame store providing equivalent definition. The provision of data for a large number of points allows the operator to go close in for detailed work on the skin. To facilate retrieval of the data from the skin store 1 the storage locations in the stores may be identified by a matrix of two dimensional addresses, and the data for any particular point on the skin may then be stored in the two dimensional address which would be occupied by the point on the skin, on the assumption that the skin is cut and laid open to lie flat on the plane of the store. Additionally each storage location in the skin store 1 may be provided with a location number and the data stored at each location may then include the numbers of a group of locations storing the data for points on the skin which are physically adjacent the first mentioned location. This facilates reading of the data from the skin store (under control of the computer 3) in a desired systematic order.

Assume initially that successive storage locations in the store 1 are read in response to addresses from the address generator 2. The X Y Z component signals from each address are fed, upon being read, to a chisel processing circuit 12 and to an adding circuit 56. The chisel processing circuit 12 will be referred to in greater detail subsequently and, as will then appear, it provides selectively, under operator control, incremental signals delta X, delta Y, and delta Z. These signals form the second input to the adding circuit 56 where they are added to the X Y Z components read at the respective time from the skin store 1. For convenience, the X Y Z component signals as read from the store 1 are termed "old X Y Z" signals and the signals with added increments produced by the adding circuit 56 are termed "new X Y Z" signals. The new X Y Z signals from the adding circuit 56 are passed to a floating viewpoint circuit 9. The old X Y Z signals from the store 1, without increments, are also passed directly to a second floating viewpoint circuit 80, which is similar to the circuit 9. The viewpoint circuits 9 and 80 can be operated under operator control to transform the new and old X Y Z to represent a shift of the coordinate system 14, as will be further described subsequently. The transformed new X Y Z signals, referred to for convenience as "new X Y Z (view)" signals are applied to a so-called starlight circuit 76 and to a three dimensional-to-two dimensional converting circuit 77.

The signals delivered by the circuit 80, termed the "old X Y Z (view)" signals, are applied to a second starlight circuit 10 and to a three dimensional-to-two dimensional converting circuit 11, which are similar respectively to the starlight circuit 76 and the 3D - 2D converting circuit 77 already referred to. When signals are read from any storage location in the skin store 1, the R G B S component signals from that location (representing the colour and the stencil value for the point defined by the respective X Y Z component signals) are applied by channel 84 to the starlight circuit 10 and also to a colour processing circuit 75 which may modify the R G B components of the signals read from the store 1 in response to inputs from a circuit 74. The modified R G B component signals together with the unmodified S component (which passes the circuit 75 unchanged) are fed to the other starlight circuit 76. The R G B S component signals derived from the skin store 1 are for convenience referred to as the "old R G B S" signals', whereas the corresponding components output from the colour processing circuit 75 are termed the "new R G B S" signals.

It will be assumed, first, that the circuit 12 is inoperative, so that no incremental signals delta X, delta Y, and delta Z, are applied to the adding circuit 56. On this condition the output of the circuit 56 equals the old X Y Z signals and the output of the circuit 9 comprises these signals subjected to such transformation as imparted by that circuit 9. The output of the circuit 80 (is the same) and the spatial coordinate signals for each point on the skin, as applied to the starlight circuit 10 and the 3D-2D converting circuit 11, are the same as applied to the starlight circuit 76 and the 3D - 2D converting circuit 77; namely the old X Y Z (view) signals. This condition is in fact established when desired, at the commencement of signal processing, to load a picture store 15 shown at the bottom of FIG. 1. While such loading is taking place colour processing circuit 75 is transparent to the old R G B S signals in the channel 84 which therefore constitute the input to the starlight circuit 76 instead of new R G B S signals. At the same time, the circuits 10, 11 (and 13) are inoperative. To load the picture store 15, sequential reading of the signals in the store 1 occurs under control of the address generator 2 and the computer 3 and the R G B S components are stored in the store 15 at addresses determined by the corresponding X Y Z components and by operator inputs to the system. The stored signals can be read to a monitor 17 to form a display.

The floating viewpoint control system 9 (and also 80) is based on that described in United Kingdom Patent No. 2,158,671 and it is set up to enable the X Y Z component signals for each image point to be transformed systematically so as to simulate a rotation and/or displacement of the object the shape of which is defined by the initial set of coordinate components in skin store 1. Reference 18 denotes a view selector such as a keyboard or control panel whereby the operator can define a desired movement of the object 4 so that when it is reproduced on a monitor (to be referred to subsequently) it is seen as from a different viewpoint. The changes required in the X Y Z components are such as would be dictated by a shift of the system of coordinates and the algorithms for producing such changes are well known and need not be described here. The input device provides, in response to operator-inputs, signals defining the required change at any particular time and reference 19 denotes a circuit which calculates, for each change, a set of coefficients which define the required transform of the X Y Z components. The coefficients are applied to the floating viewpoint system 9 where they effect the required transformation of the X Y Z components for each picture point in the frame whether or not modified by the chisel processor 12. If no change of viewpoint is indicated by the view selector 18 X Y Z components signals are passed through the system 9 without change. More details of the floating view point control system can be found in our British Patent No. 2,158,671.

To illustrate the operation of the floating view point system assume that the operator, by use of the view selector 18, has indicated a rotation of the object 4 clockwise through 180° about the a vertical axis to simulate a rotation of the assumed view 16 in the opposite direction through the same angle. The system 9 changes the coordinates X1 Y1 Z1 of point 5 to X3 Y3 Z3, changes the coordinate X2 Y2 Z2 of point 6 to X4 Y4 Z4 (the initial coordinates of point 15), and changes the coordinate X3 Y3 Z3 of point 7 to X1 Y1 Z1. The transformed sets of coordinates are applied to the starlight system 76 and to the 3D - 2D converter 77 in time with the respective R G B S component signals from channel 84. The R G B S for point 5 on the object arrive at the starlight system 76 in time with the transformed coordinates X3 Y3 Z3 and so on for the other picture points. It will be appreciated that point 6 has moved to the back of the object 4 as a result of rotation and assuming object 4 is opaque, would be invisible from the viewpoint 16. No change in the skin shape of the object 4 occurs as a result merely of the change of viewpoint.

Figure 3:
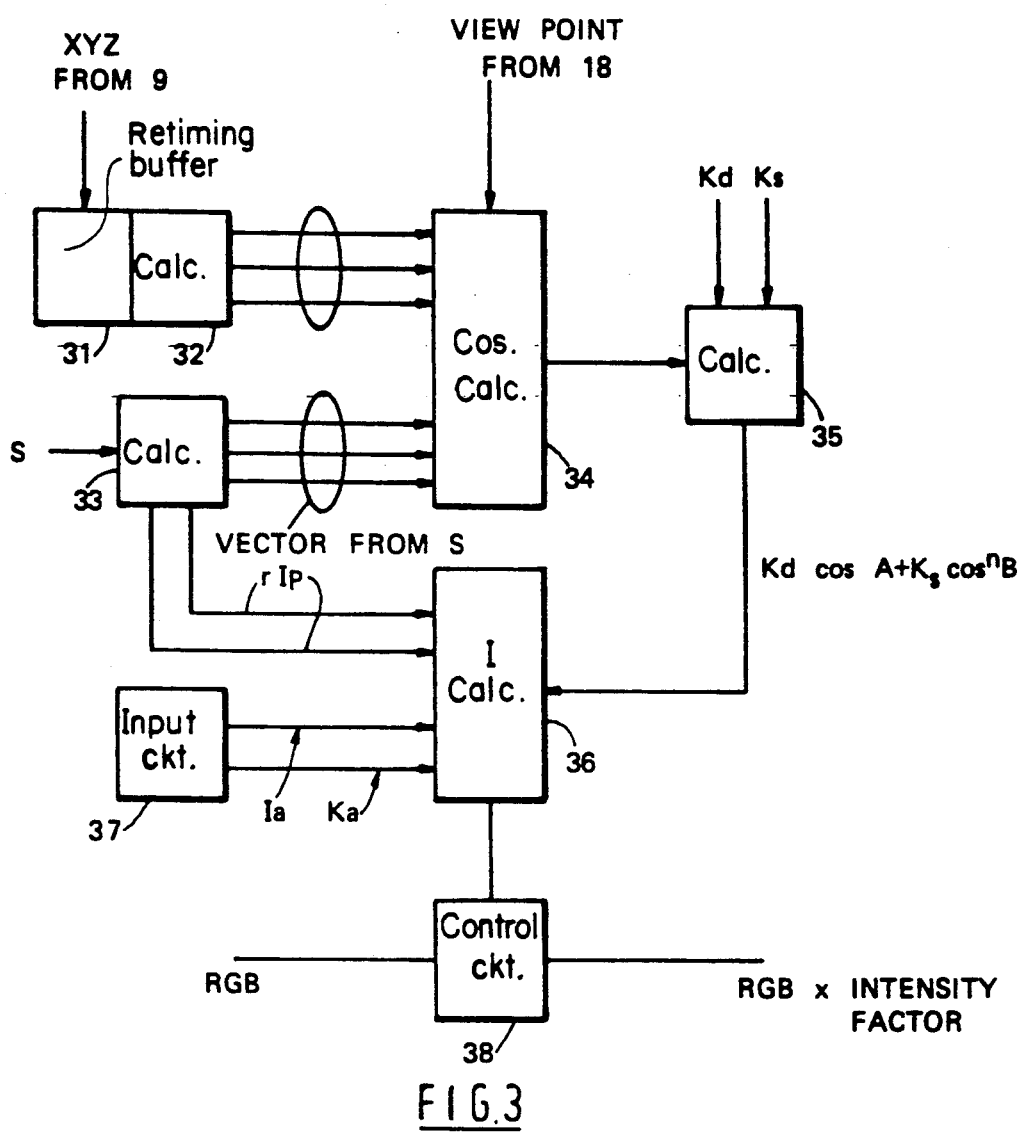
FIG. 3 illustrates in block form a so-called starlight circuit used in the example
Figure 4:
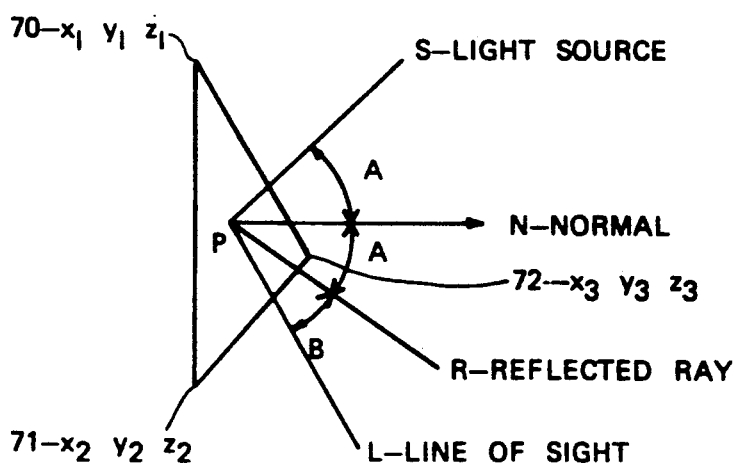
FIG. 4 is a diagram explanatory of FIG. 3

The starlight system 76 assists the operator to obtain a good impression of the 3D shape of the object when it is displayed on monitor 17, although the image is then in 2D. The system 76 is based on that described in our European Patent Application No. 248626A (equivalent to U.S. patent application Ser. No. 052,464) and is shown in more detail in FIG. 3 hereof. In this Figure reference 31 denotes a retiming buffer which receives the X Y Z components read from the floating viewpoint system 9. The signals are held in the buffer in "shifting" batches sufficient to enable the computation about to be described to be effected for each image point. Thus each batch includes spatial coordinates, say x1 y1 z1, x2 y2 z2 and x3 y3 z3, for three image elements 70, 71, 72 adjacent the image point P for which the computation is effected at a particular time; see FIG. 4. The three elements 70, 71, 72 define a small facet of the skin of the object 4, including the point P, and the respective coordinates are applied to a circuit 32 which utilises them to calculate the three components of the unit vector NP which is normal to the facet at the point P. Reference 33 denotes a circuit which receives operator controlled inputs defining the position S of a point source of light (assumed to be white in this example) representing a notional spot-light selectively positioned by the operator. The circuit 33 in turn evaluates the three components of the vector SP shown in FIG. 4. The components of the vectors NP and SP are applied to a further circuit 34 which evaluates cos A, where A is the angle between NP and SP as shown in FIG. 4. The circuit 34 also receives an input representing the components of a unit vector LP defining the line of sight from P to the viewing surface 73 (FIG. 2) which may be assumed to be fixed. In response to these, and the other aforesaid inputs, circuit 34 evaluates cos B, where B is the angle between LP and RP, where RP is the direction of the ray SP reflected from the facet under consideration.

The light I directed to the viewer from point P on the skin is, in this example, expressed by the formula:

$$I = IaKa + \frac{Ip}{r+k} [Kd \cos A + Ks \cos^n B]$$

where
Ia = ambient light intensity
Ka = reflection coefficient for the skin
Ip = point sorce intensity of the notional spot light
r = distance of the source S from the skin
Kd = diffuse reflectivity
Ks = specular reflectivity
k is an emperical constant.

These quantities can be assumed to remain constant for a particular object and illumination. The angles A and B have already been defined.

The quantities cos A and cos B are fed from the circuit 34 to a circuit 35, having additional inputs (which are predetermined) representing Kd and Ks, which evaluates the quantity $Kd \cos A + Ks \cos^n B$ (n is a small integer, say 2) and applies it to a circuit 36. The circuit 36 also receives signals representing the quantities Ip and r from the circuit 33 and signals representing Ia and Ka from an operator-controlled input circuit 37. From the aforesaid inputs, the circuit 36 evaluates I for each successive image point and the resultant signal is applied to a control circuit 38, in which the values of R G B for the respective image point are multiplied by I. Buffers may be used in the R G B signal-path to ensure that the output of the circuit 36 operates on the correct R G B components. In effect the illumination from each point on the surface of the skin is variably attenuated, depending upon the angles A and B, and the consequent variation in brightness of the surface of the skin can give the operator a good impression of the shape and surface features, even from a two dimensional projection of the object 4.

Figure 1:
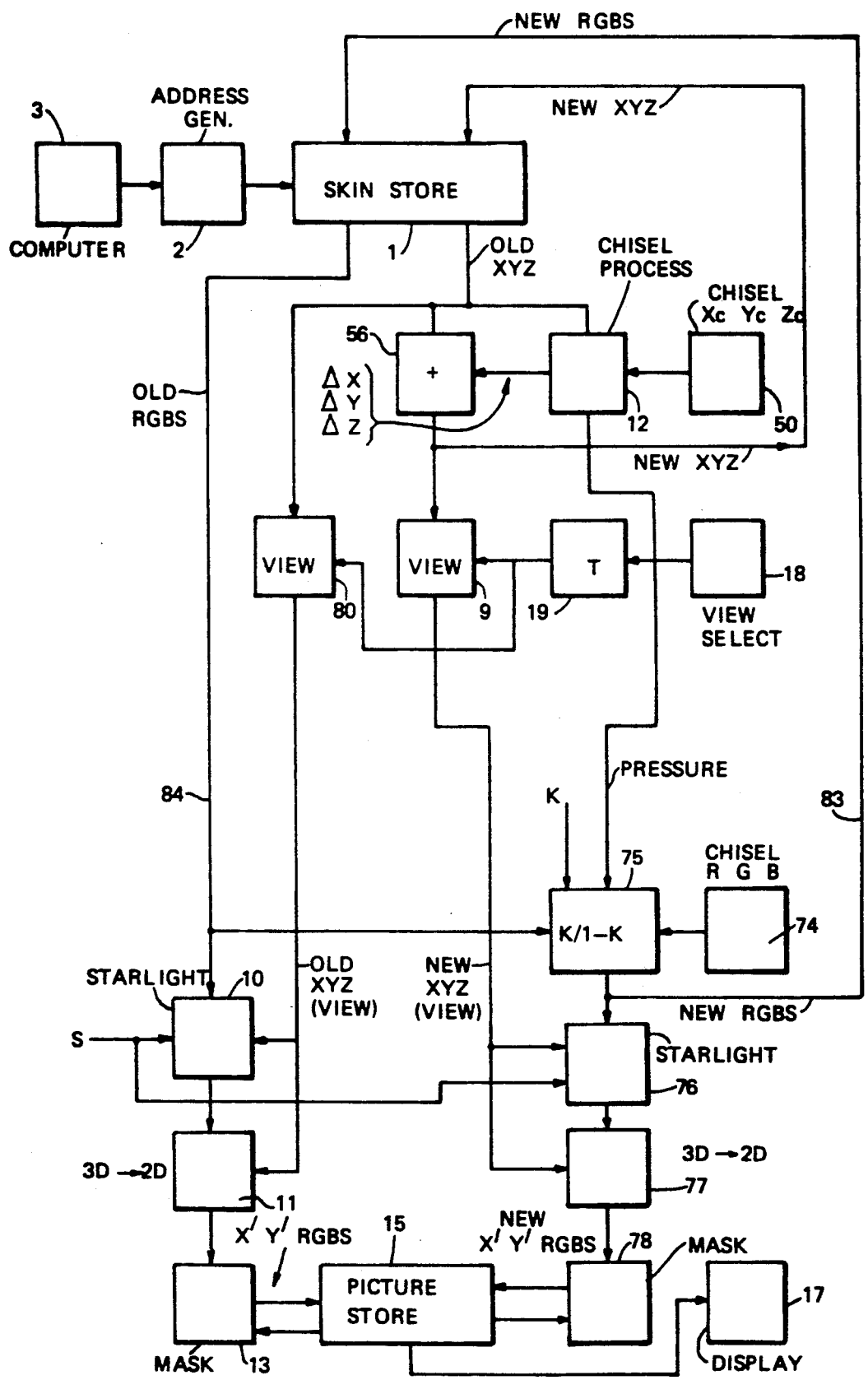
FIG. 1 illustrates the example in block form

The 3D to 2D converting circuit 77 shown in FIG. 1 converts the X Y Z components of each picture point, as the signal components emerge from the starlight system 76, into two dimensional signals X' Y' by projecting the point as seen from the viewpoint 16 on image surface 73 shown in FIG. 2. This surface is assumed to represent the viewing screen of the monitor. In FIG. 2, the projection of the image points 4, 6, 7, are shown at X'1 Y'1, X'2 Y'2, X'3 Y'3 respectively. The algorithm for 3D to 2D conversion, taking account of perspective, is well known (being indicated for example in our aforesaid UK Patent 2,158,671) and will not be further described herein. In FIG. 2 no projection of the image element 15 is shown because it is at the back of the object and could not be seen from the view point 16. However, signal components X' Y' R G B S are produced by the circuit 77 for all elements in the skin. In FIG. 1, reference 78 denotes a circuit for masking the R G B (and S) signals for image elements which would not be visible. Such masking is effected in the circuit 78 depending upon the value of Z for the image element, prior to conversion to 2-dimensions. The output of component signals X' Y' R G B S for each picture from the masking circuit 78 are applied to the aforesaid picture store 15, which is in the form of a frame store, such as widely used for digital television signals. It has storage locations for R, G, B, S, components arranged in lines to correspond to the lines of a television raster. The respective X' Y' component signals for an image element select the appropriate one of the storage locations and the R, G, B, S, components are written therein. If the X' Y' components of an image element do not coincide with the address of a storage location, but lies within the area defined by four pixel addresses, the R G B S components are distributed proportionally to the respective four addresses. During operation of the device, the video signals stored in the accumulating store 15 are repeatedly read and applied to the monitor 17 which produces a continuous image of the object 4 in two dimensions, but displaying changes in viewpoint and also other changes which may affect the object, including changes in illumination simulated by the starlight system 10. The picture store 15 in this example receives not only the R G B S component signals for points defined by the converted X' Y' co-ordinates, but has an additional plane for storing the corresponding unconverted component, applied directly from the circuit 9. It will be appreciated that as the X' Y' R G B S components are derived from a three dimensional skin, two or more points on the skin may have the same X' Y' coordinates. The masking circuit 78 is arranged to compare the Z component of each point as it arises, with the Z component of any point (for which R G B S has already been stored) having the same X' Y' coordinates. The circuit 78 is arranged to operate on one or other of three different modes depending the result of the comparison.

(1) New Z component substantially smaller than the stored Z component
    stored R G B S replaced by the new R G B S.
(2) New Z component substantially larger than the stored Z component
    stored R G B S retained and new R G B S discarded.
(3) The two Z components equal or substantially so (denoting the same or very close image points)—the most recent and the stored R G B S blended or averaged according to a predetermined function.

When the circuits 10 and 11 are operative, they operate in an identical way to the circuits 76 and 77. The output X' Y' R G B (old) are fed to a masking circuit 13, identical with the circuit 8. However, the R G B S signals applied to the store 15 via the masking circuit 13 are applied to the respective location identified by X' Y' in negative sense, that is subtracted form the store.

As so far described, the FIG. 1 example provides for the storage in store 1, of video signals representing the spatial coordinates of points on the surface or skin of a three dimensional object located in a predetermined position, the storage in related positions in the store 1 of video signals representing the visual characteristics of the respective points on the skin (together with the related stencil signals), the transformation of the spatial coordinates to represent a change in the viewpoint for the object, the variable modification of the video signals to produce the effect of selectively lighting the object, the conversion of the spatial coordinates from three dimensions to two dimensions, representing projection of the object on a viewing surface, and the storage of the modified video signals in the accumulating store 15 in raster format, at positions determined by the 2D spatial coordinate signals. The video signals in the accumulating store 15 are read sequentually and applied to the monitor 17 for display. Consideration will now be given to the parts of the device for locally modifying the spatial coordinate signals of points on the skin to represent selective, operator controlled, deformation or chiselling of the object. During such operation the circuits 10, 11 and 13 are operative and the video signals from these circuits are read with negative polarity into the picture store 15.

Reference 50 represents an operator-controlled input device for setting up signals representing the spatial coordinates of a selected point of application of a notional deforming tool, which will be refered to hereinafter as a chisel. Device 50 may be a keyboard device, a joystick device or other form of device. It delivers to the chisel circuit 12 component signals Xc Yc Zc representing spatial coordinates of the designated point of application of the chisel.

Figure 5:
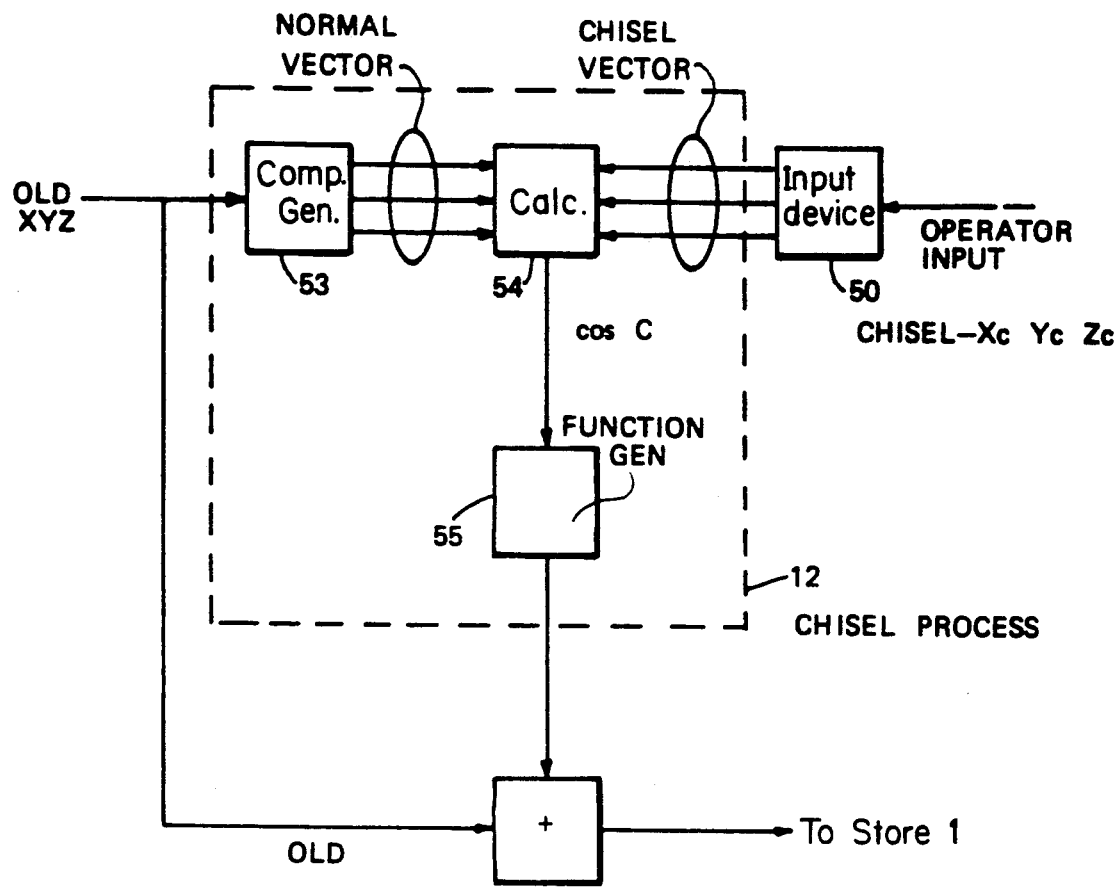
FIG. 5 illustrates in block form a so called "chisel" circuit used in the device
Figure 6:
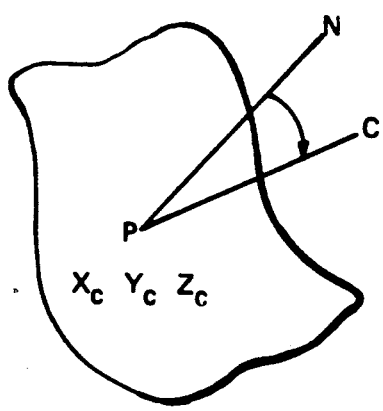
FIG. 6 is a diagram explanatory of FIG. 5

The component signals Xc Yc Zc set up by the circuit 50 are also applied to the computer 3, where they cause sequential reading of the skin store 1 to be interrupted by reading from the address at which is stored information for the point Xc Yc Zc, the address generator 2 being suitably controlled by the computer to this end. Means not shown are provided to cause a cursor to be displayed on the display produced by the monitor 17 at the appropriate projection of the point Xc Yc Zc on the screen 73. The cursor assists the operator to select a point on the object at which he wishes to produce a deformation. The device 50 (FIGS. 5 and 6) also includes means of providing, in response to operator-input, signals representing a "chisel" vector PC giving the direction of application of the chisel and the desired depth of penetration into the object. The chisel vector is represented by its X Y Z components in the same way as the light source vector PS in FIG. 4. The various signals from the input device 50 are applied to the chisel processor 12. This circuit is similar to the starlight circuit 76 and, as illustrated in FIG. 5, it comprises a circuit 53 to which are applied the spatial coordinate signals as read from the skin store 1 in response to the chisel input circuit 50. The input signals to the circuit 53 at any one time thus represent the spatial coordinates of a point on the skin of the object selected by the operator as the point of application of the chisel. To assist him in making the selection, the operator can bring the part of the skin containing the point directly into his view on the monitor 17, using the viewpoint circuit 9. The circuit 53 generates the three component signals of the normal vector PN at the respective chisel point, and these vector components are applied to a calculating circuit 54, together with the chisel vector components from the input device 50. The calculating circuit 54 is set up to generate a signal representing cos C, where C is the angle between the two vectors CP and NP. This output signal from circuit 53 is applied to a function generator 55 which may include a look-up table together with the component signals representing the chisel vector PC. Responsive to those inputs, the function generator produces the incremental signals delta X, delta Y, delta Z which represent the shift of the respective image point in space which would be produced by the chisel, applied in the selected direction and with the selected penetration, at the repective image point.

The signals delta X, delta Y, and delta Z when applied to the adding circuit 56 are added to the old X Y Z component signals coming directly from the skin store 1. The addition produces a displacement of the respective point to simulate the desired deformation or shaping. The component signals produced by the adding circuit (the new X Y Z signals) are fed back to the store 1 where they replace the old X Y Z signals and they are also applied to the floating viewpoint circuit 9 which has already been described. In the circuit 9 the new X Y Z signals are transformed under control of the circuits 18 and 19. As previously indicated the old X Y Z components signals from the store 1 are similarly transformed in the circuit 80.

Reference 74 denotes a further input device for providing operator-selected R G B component signals, representing a particular colour or characteristic which the operator wishes to impart to the skin of the object by the application of the chisel. These signals, which may be called chisel R G B signals are applied to the processing circuit 75, which receives a further input of the corresponding old R G B component signals for each picture point as they are read from the skin store 1. Circuit 75 also receives a factor signal K, representing the pressure applied to the chisel (which may be related to the chisel penetration previously referred to), and this signal K is used as a control signal in the processing circuit 75. The processing circuit blends the old R G B and chisel R G B as a function of K, as expressed (for the red component) by the formula:

$$K \text{ (old R)} + (1-K) \text{ chisel R}$$

the G and B being similarly modified. The modified R G B component signals for each picture point affected by the chisel are fed back via channel 83 from the circuit 75 to the skin store to replace the old R G B components for the respective address.

The new X Y Z (view) component signals from the adding circuit 56 were applied to the starlight circuit 76. The new R G B signals are also fed to the circuit 76 which selectively illuminates the object, as modified in shape. The new R G B component signal, as modified by the starlight circuit 76 (and also the X component signal, which is unaffected by the processing circuit 75) are passed to the 3D - 2D converting circuit 77, where they meet up with the respective new X Y Z (view) component signals. In circuit 77 the X Y Z (view) component signals for successive elements on the skin of the object are converted to new two dimensions X' Y' component signals, defining the projection of the corresponding elements on the viewing surface 73. The sets of component signals for different image elements are then applied, via the masking circuit 78, to the accumulating store 15 and the new R G B S components are written at the addresses identified by the new X' Y' component signals. As new R G B S is written at any address in the store 15, old R G B S for the original image point, not displaced by the chisel but as modified by the starlight circuit 10, is fed in negative sense to the address in the store 15 identified by the old X' Y'. Therefore when new R, G, B, signals are applied to an address in the store 15, the respective old R G B signals are discarded. As the signals in the store 15 are modified, due to the action of the chisel, the monitor will display, in two dimensions, an image of the object as the shape is progressively modified.

Floating viewpoint circuits, such as 9, starlight systems, such as 11 and 76, and processing circuits such as 75 are currently available articles of commence being incorporated for example in video processing systems, sold by the Applicant/Assignee of the present patent application, under the trade mark Mirage. Moreover, in the example of the invention as described, certain circuits such as 9 and 80, 10 and 76, 11 and 77, 13 and 78, are duplicated, and a single circuit may be arranged to serve the two functions on a time-sharing basis. Indeed, circuits and systems shown individually may in some cases be provided by suitably programming the computer 3.

The chisel circuit 12 as described is arranged so that, for each point of application identified by the circuit 50, a displacement of the skin represented by delta X, delta Y, delta Z is produced at the point of application. The circuit 12 may however be arranged to produce displacement signals not only for the identified element but also for a patch of adjacent elements, the displacement signals for the adjacent elements being related to the identified element by some desired function. The function may moreover be selectable from among a prestored group of functions, representing different chisel "shapes". In this case, for each point of application selected for the chisel, the computer 3 is arranged to address, in sequence, the image elements within the patch, and the signals from the skin store derived from these addresses are processed in succession, before the computer moves on to the next elements of application of the chisel.

In the device illustrated in FIG. 1, buffer circuits are incorporated as needed to maintain proper time relationship between component signals taking different paths through the device. Furthermore, although the component signal such as X Y Z, R G B S, are spoken of collectively, the various circuits and signal paths are provided with separate channels or sections for the respective components.

The action of the "chisel" may have the effect of stretching the skin represented by the points in the store 1 to an unacceptable degree and means may be provided for remapping the points on the skin should this occur, in order to introduce extra points.

What we claim is:

1. An electronic image processing apparatus in which a three dimensional object having a surface is defined by data representing plural independent surface points on the surface of the object, each surface point having a surface attribute and being located at a point in space, the apparatus comprising:
    data storing means for storing data defining said surface points;
    defining means for defining data representing a notional deforming tool;
    user operable identifying mans for identifying at least one surface point;
    processing means for reading from said storing means data defining said at least one surface point, modifying said read data with said deforming tool data, and writing said modified data to said store to replace respective data previously stored thereat, said data being modified such that the surface of the object at said at least one surface point is changed in form; and
    display means for displaying at least part of said three dimensional object surface and a representation of said deforming tool to facilitate user identification of said at least one surface point.

2. A system as claimed in claim 1, further comprising a light source simulating means for modifying the surface point data so as to simulate the effect of illuminating the surface from a notional light source.

3. A system as claimed in claim 1, further comprising a user operable viewpoint selecting means for use in selecting a viewpoint from which at least a surface portion of the three dimensional object is viewed.

4. A system as claimed in claim 2, further comprising a user operable viewpoint selecting means for use in selecting a viewpoint from which at least a surface portion of the three dimensional object is viewed.

5. A system as claimed in claim 3, wherein the viewpoint selecting means is adapted to enable selective viewing and modification of different locations on the surface of the three dimensional object.

6. A system as claimed in claim 4, wherein the viewpoint selecting means is adapted to enable selective viewing and modification of different locations on the surface of the three dimensional object.

7. A system as claimed in claim 3, further comprising masking means for identifying and masking surface point data relating to surface ares hidden by other areas of the surface when viewed from the selected viewpoint.

8. A system as claimed in claim 4, further comprising masking means for identifying and masking surface point data relating to surface areas hidden by other areas of the surface when viewed from the selected viewpoint.

9. A system as claimed in claim 1, wherein the data storing means comprises a framestore.

10. A system as claimed in claim 1, wherein the surface point data further includes surface attribute information representing the element color for each of said surface points.

11. A system as claimed in claim 1, wherein said user operable identifying means comprises a joystick.

12. A system as claimed in claim 1, wherein said user operable identifying means comprises a keyboard.

13. A system as claimed in claim 1, wherein said processing means is arranged to modify repeatedly the surface point data and the display mans is arranged to display continuously at least the modified part of said surface.

14. Electronic image processing apparatus for use in manipulating data representing a three dimensional object having a surface defined by plural independent surface points each having a surface attribute and being located at a point in space, the apparatus comprising a memory device arranged to store three dimensional position data for each of said points defining said surface and attribute data defining a surface attribute of each of the points, and user operable input means for modifying both the position data and the attribute data for points selected by the user, such that the surface of the object is changed at the selected points, and for writing said modified position data and attribute data in said memory device in place of the data which has undergone modification.

15. An apparatus as claimed in claim 14 further comprising picture storage means and monitor means for displaying a representation of the object defined by data stored in said picture storage means, and means for effecting a three dimensional to two dimensional conversion of position data in said memory device and for writing related attribute data in said picture storage means in raster order as determined by the converted data.

16. An apparatus as claimed in claim 15, wherein positional data in said memory device is repeatedly converted to two dimensions whereby the effects of modifying both the position data and the attribute data are interactively displayed by said monitor means.

17. An apparatus as claimed in claim 14, wherein said user operable means is adapted to enable selective manipulation of position information associated with each said point.

18. An apparatus as claimed in claim 14, wherein said user operable means is adapted to enable selective manipulation of color information associated with each said point.

19. An apparatus as claimed in claim 16, wherein in response to selective manipulation of said surface point data, modifications are made to locations of said memory device containing contributions from said manipulated surface point data.

20. An apparatus as claimed in claim 17, wherein in response to selective manipulation of said surface point data, modifications are made to locations of said memory device containing contributions from said manipulated surface point data.

21. An apparatus as claimed in claim 19, wherein said memory device locations are each modified by first subtracting previous contributions made to said locations by selected surface point data prior to manipulation and then adding new contributions to said locations after said manipulation.

22. An apparatus as claimed in claim 20, wherein said memory device locations are each modified by first subtracting previous contributions made to said locations by selected surface point data prior to manipulation and then adding new contributions to said locations after said manipulation.

23. An apparatus as claimed in claim 14, further comprising operator controlled means for changing the viewpoint of the object allowing selective viewing and modification of different locations on the surface of the object.

24. An apparatus as claimed in claim 14, further comprising means for simulating the effect of illuminating the surface of the object from a notional light source.

25. An apparatus as claimed in claim 14, wherein data for each surface point includes information identifying the location of other surface point data in said memory device.

* * * * *